(12) United States Patent
Zhang et al.

(10) Patent No.: US 12,379,934 B2
(45) Date of Patent: Aug. 5, 2025

(54) DECOUPLING SILICON INITIALIZATION AND BOOTLOADER BY PROVIDING SILICON INITIALIZATION SERVICE

(71) Applicant: Intel Corporation, Santa Clara, CA (US)

(72) Inventors: Di Zhang, Shanghai (CN); Sarathy Jayakumar, Portland, OR (US); Vincent Zimmer, Issaquah, WA (US); Fei Li, Shanghai (CN); Bo He, Shanghai (CN); Zhuangzhi Li, Shanghai (CN); Zhi Jin, Shanghai (CN); Lin Chen, Huaihua (CN); Guomin Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 17/449,098

(22) Filed: Sep. 28, 2021

(65) Prior Publication Data

US 2022/0019444 A1    Jan. 20, 2022

(30) Foreign Application Priority Data

May 20, 2021    (WO) ................ PCT/CN2021/094995

(51) Int. Cl.
*G06F 9/00*    (2018.01)
*G06F 1/24*    (2006.01)
*G06F 9/4401*  (2018.01)

(52) U.S. Cl.
CPC .............. *G06F 9/4405* (2013.01); *G06F 1/24* (2013.01)

(58) Field of Classification Search
CPC ................................. G06F 9/4405; G06F 1/24
See application file for complete search history.

(56) References Cited

U.S. PATENT DOCUMENTS

| | | | | |
|---|---|---|---|---|
| 9,250,920 B2* | 2/2016 | Sanner, III | ............ | G06F 9/4405 |
| 11,768,691 B2* | 9/2023 | Banik | .................... | G06F 12/084 |
| | | | | 713/2 |
| 12,222,830 B2* | 2/2025 | Chandra | ............. | G06F 11/1433 |
| 2008/0288764 A1* | 11/2008 | Lu | .......................... | G06F 15/177 |
| | | | | 713/2 |
| 2010/0268931 A1* | 10/2010 | Borkar | ...................... | G06F 1/32 |
| | | | | 714/E11.178 |
| 2015/0067369 A1* | 3/2015 | Henry | .................... | G06F 1/3287 |
| | | | | 713/323 |

* cited by examiner

*Primary Examiner* — Tammara R Peyton
(74) *Attorney, Agent, or Firm* — 2SPL Patent Attorneys PartG mbB; Yong Beom Hwang (57) ABSTRACT

An electronic device is disclosed, including a first set of processor cores including at least one processor core and a second set of processor cores including at least one processor core. The electronic device is configured such that during initialization of the electronic device: the first set of processor cores executes first initialization instructions in a first execution environment, the second set of processor cores executes second initialization instructions in a second execution environment, and the first set and the second set at least one of read or write to a shared register.

22 Claims, 6 Drawing Sheets

| Register Name | Bit | Field | Description |
|---|---|---|---|
| ASIS_STS | 0 | asis_ready | 0: ASIS not ready<br>1: ASIS ready<br>ASIS write to 1 to after ASIS init to indicate ASIS is ready to accept commands |
| | 1 | asis_exit | 0: ASIS is not exited<br>1: ASIS is exited<br>ASIS write to 1 to after finishing all the commands to indicate ASIS is exited so that APs can be owned by bootloader. |
| | 31:2 | Reserved | |
| ASIS_CAR_BASE | 31:0 | car_base | The Cache as Ram base address.<br>Set by ASIS after CAR initialized in ASIS. Bootloader will read to setup BSP CAR. |
| ASIS_CAR_SIZE | 31:0 | car_size | The Cache as Ram size.<br>Set by ASIS after CAR initialized in ASIS.<br>Bootloader will read to setup BSP CAR. |
| ASIS_CMD | 27:0 | asis_cmd | The ASIS CMD number.<br>Set by Bootloader to issue the CMD to ASIS.<br>The CMD definition can be varies per silicon vendor.<br>CMD 0xFF is a special CMD to put ASIS in Auto Run Mode to do serialized silicon initialization. |
| | 31:28 | asis_cmd_sts | 0xFF: CMD is under executing.<br>0x1: CMD is done<br>0x2~0xFE: CMD return value. |
| ASIS_CMD_PARA | 31:0 | asis_cmd_para | The address of the CMD input parameters. It should be a pointer to point to the CMD parameters. The parameter struct and size are pre-defined for each CMD. |

DECOUPLING SILICON INITIALIZATION AND BOOTLOADER BY PROVIDING SILICON INITIALIZATION SERVICE

CROSS-REFERENCE TO RELATED APPLICATIONS

This application claims the benefit of international application PCT/CN2021/094995 filed May 20, 2021, entitled, "A Method to Fully Decouple Silicon Initialization and Bootloader by Providing Abstract Silicon Initialization Service (ASIS)," the contents of which are incorporated herein by reference in their entirety.

FIELD

Examples relate to device boot operations and initializations such as upon reset of an electronic device.

BACKGROUND

Various operations may be performed upon activation or reset of an electronic device which may include multiple processor cores. Basic Input Output System (BIOS) and Unified Extensible Firmware Interface (UEFI) are often utilized. BIOS and/or UEFI may provide a system or interface between an operating system and firmware.

System firmware, BIOS, and/or UEFI may have multiple parts. A first part can be the binary of a Firmware Support Package (FSP). The first part can be developed and released, for example, to an Original Design Manufacturer and/or Original Equipment Manufacturer (ODM/OEM). The first part can include confidential silicon initialization logics.

A second part, which can be owned by ODMs/OEMs, can be integrated with the FSP binary into a bootloader which may orchestrate the boot flow.

Several challenges can arise when different entities, such as silicon vendors, OEMs, and ODMs may be responsible for different parts. Further, system firmware can include confidential silicon initialization logic which may be desirable to keep secret and/or secure.

BRIEF DESCRIPTION OF THE FIGURES

Some examples of apparatuses and/or methods will be described in the following by way of example only, and with reference to the accompanying figures, in which.

DETAILED DESCRIPTION

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the instructions contained in the software or firmware are not actively being executed by the system, device, platform, or resource.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Herein a set can be one or more. For example, a set of processing cores can be one or more processing cores. A trailing "(s)" means one or more; for example "register(s)" can be one or more registers.

Figure 1:
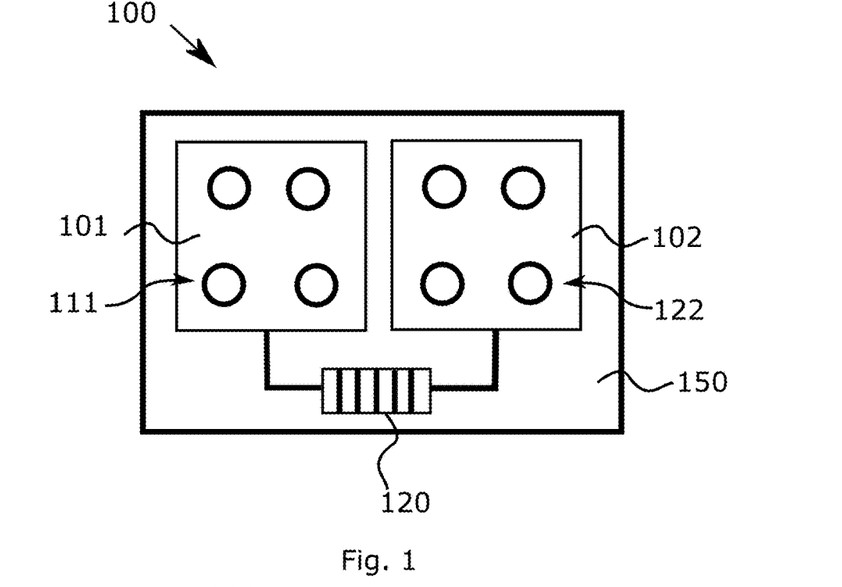
FIG. 1 illustrates an electronic device.

FIG. 1 illustrates an electronic device 100. The device 100 has a first set 101 of processor cores including at least one processor core 111 and a second set 102 of processor cores including at least one processor core 122. During initialization of the electronic device 100, the first set 101 of processor cores can execute first initialization instructions in a first execution environment, and the second set 102 of processor cores can execute second initialization instructions in a second execution environment. Having first and second execution environments can provide security during initialization.

During initialization, the first set 101 and the second set 102 can read and/or write to at least one shared register 120. A die 150 can include the first and second sets 101, 102 of processor cores. The first and second sets 101, 102 of processor cores can be communicatively coupled, during initialization of the device 100, through the register(s) 120, e.g. exclusively through the register(s) 120 during initialization of the electronic device 100.

Particularly during initialization of the electronic device 100, each of the register(s) 120 can be write-only for the first set 101 of processor cores and read-only for the second set 102, or write-only for the second set 102 of processor cores and read-only for the first set 101. Such read/write only register(s) can aid in separating the execution environments of the sets 101, 102, e.g. for enhanced security particularly of the execution environment that performs silicon initializations.

Figure 2:
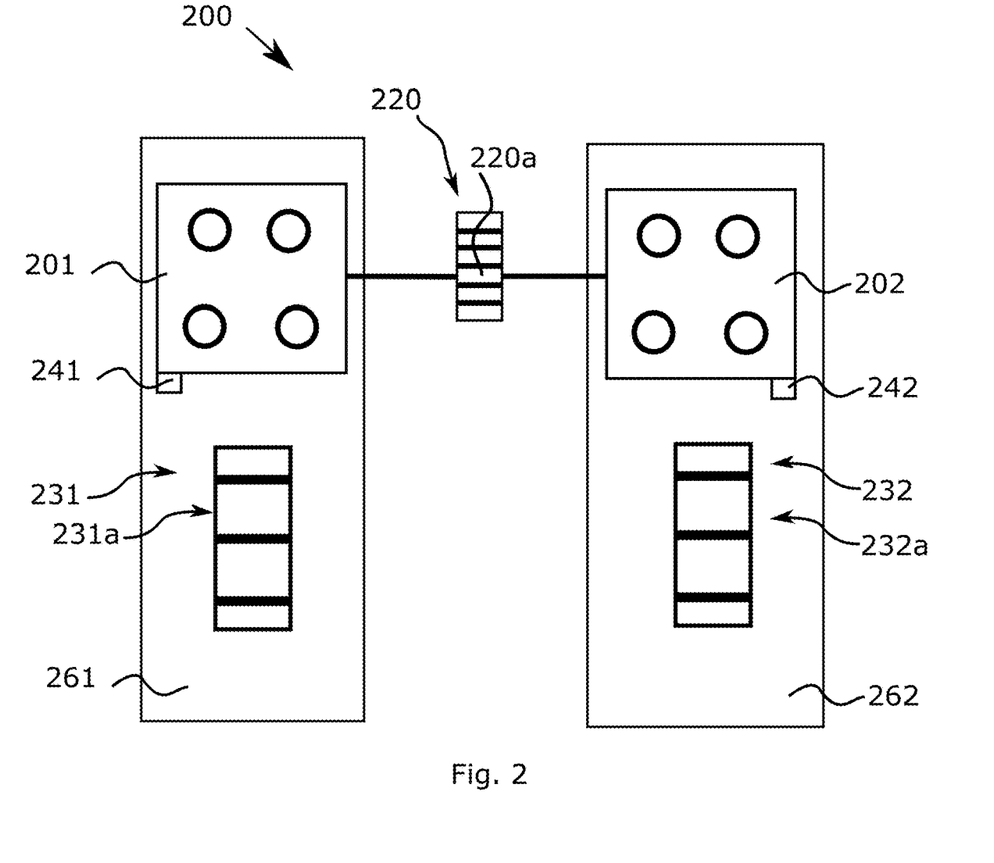
FIG. 2 illustrates an electronic device.

FIG. 2 illustrates an electronic device 200 such as that described with respect to FIG. 1. The electronic device 200 can have a first set 201 of processor cores and a second set 202 of processor cores, and a shared register(s) 220. FIG. 2 depicts first and second execution environments 261 and 262 of the respective sets 201, 202 of processor cores, particularly during initialization of the electronic device 200. The first set 201 can begin executing the first initialization instructions 231 at a first address given by a first reset vector 241. The second set 202 of processor cores can begin executing the second initialization instructions 232 at a second address given by a second reset vector 242. The first initialization instructions 231 can include a silicon initialization service 231a, which can be executed within the first execution environment 261, e.g. exclusively therein. The second initialization instructions can include a bootloader. The bootloader can poll a status of a silicon initialization service.

A silicon initialization service 231a can include any one or more of a processor initialization, chipset initialization, memory initialization, bus initialization, device initialization, memory controller initialization, or processor cache initialization, for example.

The silicon initialization service 231a can be executed in the first execution environment 261, for example. The silicon initialization service 231a can execute each of a first through Nth silicon initialization instruction(s). The first through Nth instructions can include instructions for any one or more of a processor initialization, a chipset initialization, a memory initialization, a bus initialization, a device initialization, a memory controller initialization, or a processor cache initialization, for example.

Each of the first through Nth instructions can be executed after a corresponding command 220a. The command 220a may be read from one or more of the register(s) 220. The command 220a may be read by the first set 201 of processor core(s) 111 and/or the silicon initialization service 231a working in the first execution environment 261. The command 220a may be written to the one or more of the register(s) 220 by the second set 202 and/or a bootloader 232a working in the second execution environment 262.

The register(s) 220 may communicatively couple the execution environments 261, 262; for example, the communication between the execution environments 261, 262 may be exclusively through the register(s) 220, such as via reading and writing to the register(s) 220. The register(s) may be emulated by microcode, for example. The register(s) 220 may aid in isolating and/or decoupling ODM/OEM code which may be executed in the second execution environment from vendor code which may be executed in the first execution environment. The registers may aid in securing the silicon initializations and/or preventing corruption and/or unwanted modification of the silicon initialization processes. Restrictions to license compatibilities may be relaxed between a bootloader which may operate in one environment and the silicon initializations which may operate in the other. Alternatively/additionally, the bootloader and silicon initializations, operating in respective execution environments, may be executed at least partially in parallel. This may increase speed, particularly at start-up time.

It is possible to decouple the running mode (e.g. 32 bit mode and long mode) and license between the silicon initializations and bootloader. Time to market can be improved such as by relaxing constraints on compatibilities issues such as when separated execution environments are used, as described herein, e.g. for a silicon initialization service and a bootloader to be executed in separate execution environments.

Figure 3:
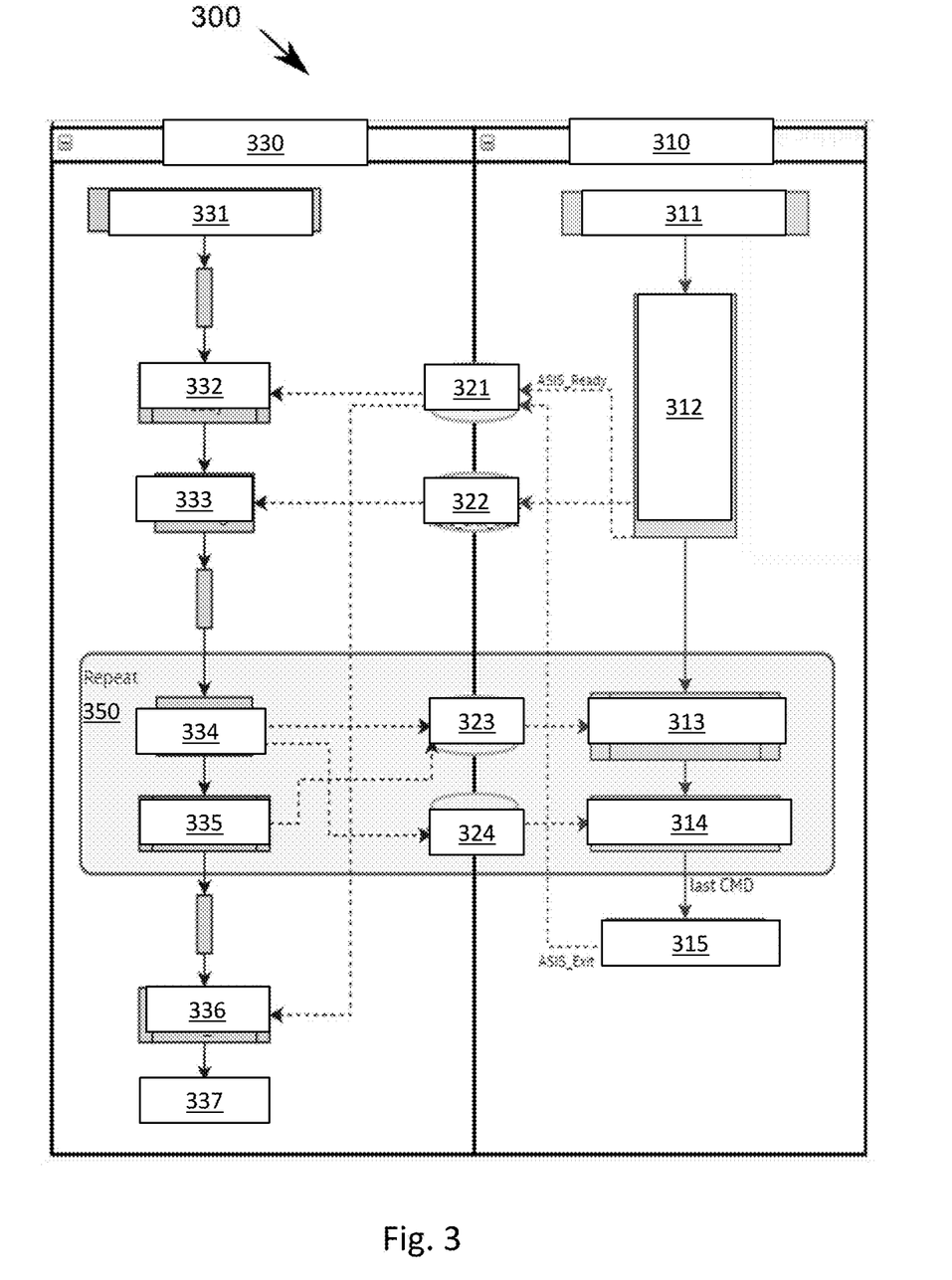
FIG. 3 illustrates the electronic device.

FIG. 3 illustrates the electronic device 300, such as that described with respect to FIG. 1 or 2. The device 300 can run a silicon initialization service 310, particularly in a first execution environment 261. A bootloader 330 can be run in a second execution environment 262. A register or plurality of registers 321, 322, 323, 324 can communicatively couple the execution environments and/or the bootloader and silicon initialization service. As shown in FIG. 3, the bootloader 330 can wake at a reset vector 331, e.g. the reset vector 331 for the second set of processor cores 102. The bootloader 330 can poll a status of the silicon initialization service 310 at a status register 321 of the plurality of shared registers. The silicon initialization service (SIS) 310 can wake at another reset vector 311, e.g. the reset vector 311 for the first set 101 of processor cores. For convenience, the reset vector 311 of the core(s) executing the SIS can be referred to as the first reset vector. Likewise, for convenience, the reset vector 331 of the core(s) executing the bootloader 330 can be referred to as the second reset vector.

The SIS 310 can write the ready state to the status register 321, or example in a SIS initialization 312. The SIS initialization may alternatively additionally write to another register data to indicate the Subsequently, the SIS 310 can wait 313 for a command.

The silicon initialization service 310 can execute each of a first through Nth silicon initialization instruction after a corresponding command for the corresponding first through Nth silicon initialization instruction is read from the plurality of shared registers, e.g. from a SIS command register 323. In FIG. 3, the block 350 can be repeated for each of the N silicon initialization instructions. Alternatively/additionally, the bootloader 330 can (in the second execution environment 262) command the execution of at least the first of the N silicon initialization instructions. The bootloader 330, for example, can write a first command to a register 323 of the plurality of shared registers. The command for execution can be written to the register 323 in the second execution environment 262, and the command read from the register 323 in the first execution environment. The N silicon initialization instructions can executed in the first execution environment. As shown in FIG. 3, the SIS can wait 313 for a command and, upon reading the command, execute 314 the Nth instruction which corresponds to the command (repeating block 350 from the first to the Nth instruction). It is also possible that the first command for execution triggers the serial execution of each of the N silicon initialization instructions.

When the last or Nth command is read and the corresponding last or Nth silicon initialization is executed, the SIS may write a status (such as an exit status) to a register such as the status register 321 and exit 315.

FIG. 3 also shows an optional parameters register 324. The bootloader 330 can provide, via the parameters register 324, an associated parameter for association with any of the first through Nth silicon initialization instructions. The associated parameter can be provided to the first execution environment for the one or more of the N silicon initializations. The associated parameter can be written to the parameters register 324 in the second execution environment 262, and read in the first execution environment 261. Alternatively (see the table of FIG. 5), an address of the parameter(s) is written to the parameters register 324. A pointer can point to the parameters, e.g. rather than to have the parameters written to the parameters register.

In the second execution environment 262, in which the bootloader 330 can be executed, as shown in FIG. 3, there is an initial wake-up at the reset vector 331, e.g. the reset vector 331 for the second set of processor cores 102. The bootloader 330 can poll the status register, e.g. to determine if the SIS is ready. As shown in FIG. 3, the bootloader 330 may read the cache as RAM (CAR) setting(s), such as an address and/or size of a CAR, at a register(s). As shown in FIG. 3, there can be a first CAR register and a second CAR register for the address and size of the CAR. The address and size of the CAR can be written to the register(s), such as CAR registers 322, by the SIS 310, from the first execution environment 261.

The bootloader can write 334 command(s) and the respective optional parameters to the register(s), particularly the registers 323, 324 shown in FIG. 3. For convenience, the register 323 can be referred to as SIS command register 323. Likewise, for convenience, the register 324 for the optional respective associated parameter(s) can be referred to as a parameters register 324 or optional parameters register 324.

The bootloader 330 can possibly wait after each command is written 334 for a status that indicates that the SIS is ready for the next command, such as by polling a register that indicates when the execution of the respective silicon initialization is done. For example, the command registers 323 may be a pair or more of registers. One of the command register(s) 323 can be for the command that is written to trigger execution of a respective silicon initialization. Another of the command register(s) 323 may be polled 335 by the bootloader for the determination that the respective silicon initialization that corresponds to the previously written command is done. When the previously commanded silicon initialization is done, then the bootloader 330 may proceed with the next command for the next silicon initialization.

Alternatively/additionally, the bootloader 330 may poll the register 321, e.g. the register referred to as a status register 321. As shown in FIG. 3, the bootloader 330 can poll 336 the status register 321 and read the exit status written by the SIS upon exit 315 of the SIS. The bootloader 330 may then determine 337, upon reading that the exit status of the SIS, that the processor core(s) of the first set 101 are available to use.

Figure 4:
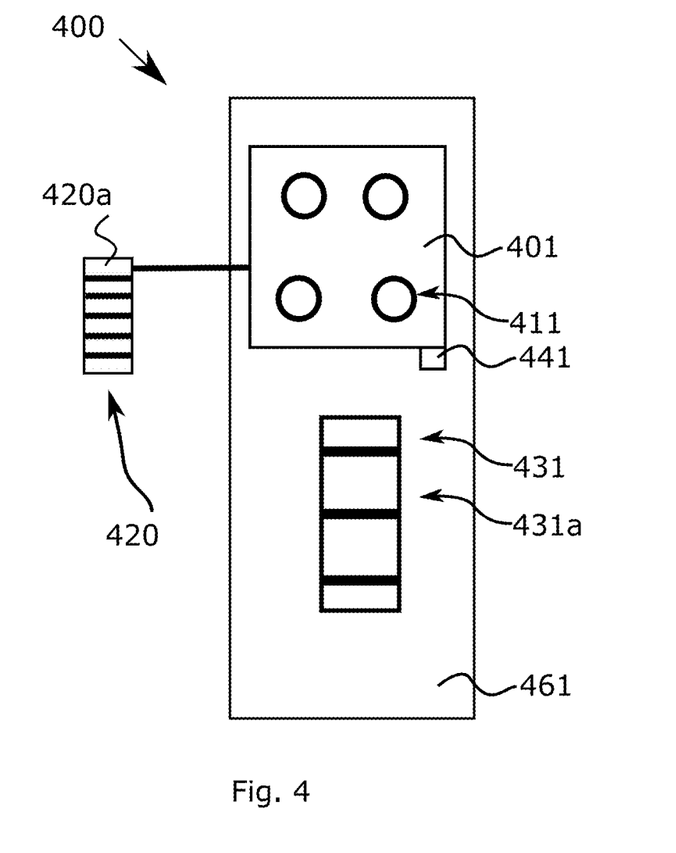
FIG. 4 illustrates an electronic device.

FIG. 4 illustrates an electronic device 400. The electronic device 400 of FIG. 4 can be part of the electronic devices explained with respect to FIGS. 1, 2, and 3. The electronic device 400 can have at least one processor core 411 which can be one of a set 401 of processor core(s), such as the first set of processor cores described with respect to any of the other figures. The processor core(s) 411 can execute a silicon initialization service 431a, such as the silicon initialization service described with respect to any of the other figures. The silicon initialization service 431a can be at least part of initialization instructions 431 that can be executed in a first execution environment 461 (such as any first execution environment described herein, e.g. with respect to other figures). The SIS 431a can write a ready status to a first register (such as a status register 420a) to indicate a ready status/state of the silicon initialization service 431a. The SIS 431a can read a command at a second register (such as a command register 420b), and execute a first silicon initialization instruction corresponding to the command. The SIS 431a can write an exit status of the silicon initialization service 431a to the status register, and exit the silicon initialization service. The SIS 431a can operate as the SIS is described with respect to the other figure(s). The ready status can be written before the first command is read. For example, the ready status is written by the SIS 431a to the register(s) 420, and the SIS 420a waits for a command to be written to the register(s) 420 before executing a first silicon initialization in accordance with the command.

The at least one processor core 411 can include a first processor core that wakes at a reset vector 441, e.g. when the electronic device 400 is reset, particularly before executing the SIS 431a.

The SIS 431a can be communicatively coupled to at least one register 420. The SIS 431a can write an address of a cache as RAM to a first CAR register, and write a size of the cache as RAM to a second CAR register.

The silicon initialization service 431a can read a plurality of commands, including the first command, at the register(s) (such as at a command register). The SIS 431a can execute a respective silicon initialization instruction of at least one silicon initialization (e.g. N silicon initializations, N being a positive integer). The silicon initialization(s) can include a first silicon initialization instruction. Each silicon initialization can correspond to a respective command of a plurality of commands which are read at the register 420. For example, as described herein, a bootloader may serially write commands at the register 420, and each command is read by the SIS 431a. With each read command, one of N silicon initializations is executed. It is also possible that a command triggers the execution of multiple silicon initializations.

One or more of the silicon initializations may use a parameter which may be read at the register(s). There may be a register that is used for parameter(s) which are associated to respective command(s) and/or silicon initialization(s). For example, a command and an associated parameter which is associated with the command can be written to register(s). The associated parameter can be read at a register, such as a parameters register. The SIS 431a can read the associated parameter, for example, e.g. in the first execution environment 461. The associated parameter can be associated with the written command (e.g. any of a plurality of commands such as those serially written to the register(s) from the second execution environment to trigger execution of respective silicon initializations in the first execution environment). For example, one of the silicon initialization may execute instructions which depend on the associated parameter which is read from the parameters register. Alternatively/additionally, the associated parameter may be a pointer and/or address of where the SIS 431a may write a return value or status.

In an example that can be combined with any other example described herein, the SIS 431a can write an initialization status to a register, such as the status register described herein and/or a second status register. The initialization status that is written can be selectable from a group of possible initialization statuses comprising: executing, done, and a return value. For example, the initialization status is written, by the SIS 431a, to a second status register; the address of the second status register may have been read by the SIS 431a from the parameters register.

For example, the silicon initialization service 431a is executed in a first execution environment 461. The electronic device 400 can be communicatively coupleable to a second execution environment through the register(s), such as through at least one of: the status register, the command register, the first CAR register, the second CAR register, the parameters register, or the second status register.

The silicon initializations, or silicon initialization instructions, can be one or more of: a processor initialization, a chipset initialization, a memory initialization, a bus initialization, a device initialization, a memory controller initialization, or a processor cache initialization. For example, the first silicon initialization instruction, which may be the first executed after reading the command from the register(s) 420, may be any one of: a processor initialization, a chipset initialization, a memory initialization, a bus initialization, a device initialization, a memory controller initialization, or a processor cache initialization.

Returning to FIGS. 1 and/or 2 for aid in understanding, an electronic device 100, 200 may include a plurality of processor cores 111, 122 including a first set 101 of at least one processor core and a second set 102 of at least one processor core. The first set 101 can execute a first initial instruction 231 at a first address given by a first reset vector 241, and the second set 102 can execute a second initial instruction 232 at a second address given by a second reset vector 242. The first set 101 can execute the first instructions in a first execution environment 261, and the second set 102 can execute the second instructions in a second execution environment 262.

The first set 101 of processor cores can start a silicon initialization service 231a in the first execution environment 261. The silicon initialization service 231 can execute a first through Nth silicon initialization after receiving a command for at least the first silicon initialization.

Figure 5:
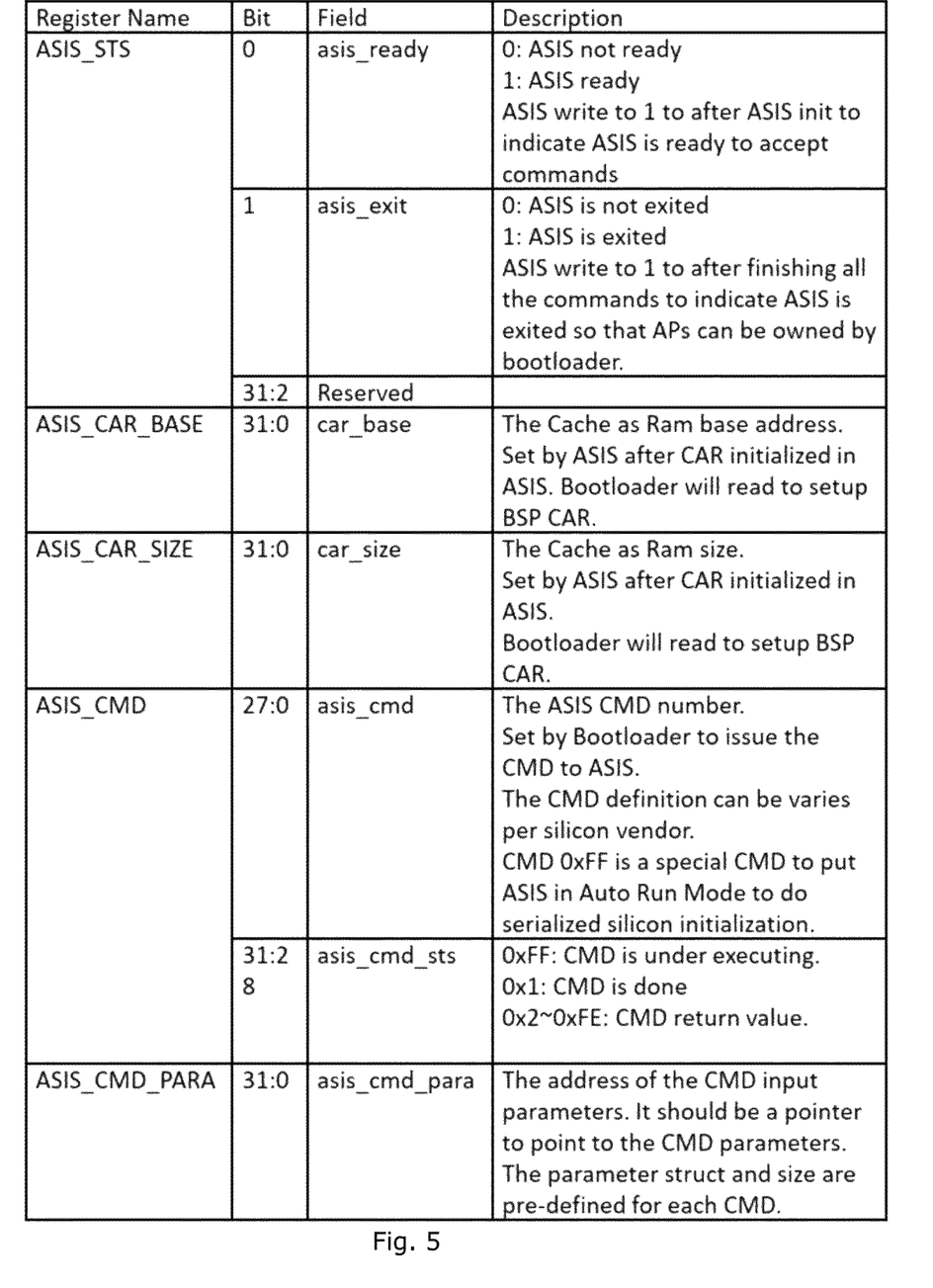
FIG. 5 illustrates a table.

FIG. 5 illustrates a table of possible registers. Any one or more of the registers shown in the table may be used in any of the electronic devices, 100, 200, described herein. The table shows registers that may be read-only from one execution environment, and write-only from another. A status register, ASIS_STS, is described in the table. The table refers to the SIS 431a as an "ASIS." The status register may have multiple bits, as described in the table. Bit 0 may describe the ready state of the SIS, e.g. 0 is not ready and 1 is ready. The SIS can write 1 to the asis_ready field of the AIS_STS register to indicate that the SIS is ready to accept/read commands.

The status register can have a bit that indicates whether the SIS is exited, such as bit 1. The SIS can write 1 to the asis_exit bit after executing the silicon initializations, e.g. those which were triggered by the command(s). The exit status can indicate to the bootloader which may read the asis_exit field that the SIS is exited. For example, subsequent to reading the exit status, the processor cores can have access to the processor cores, e.g. all the processor cores. Subsequent to exiting of the SIS, the first and second execution environments may be unseparated. Alternatively/additionally, after SIS exiting, the bootloader may have ownership of up to all the processors and/or cores. Alternatively/additionally, after SIS exiting, the bootloader may operate up to all of the cores. The status register may include reserved fields, such as to provide flexibility for upgrades.

The registers may include first and second CAR registers, as described herein. The table of FIG. 5 shows an ASIS_CAR_BASE register name which can provide the address of a cache as RAM. The SIS can write to the ASIS_CAR_BASE register, e.g. after the CAR is initialized by the SIS (for example, in SIS initialization 312). The bootloader can read the address at the ASIS_CAR_BASE register and can have and/or set up cache as RAM for the processor core(s) in the second execution environment. The CAR registers may have a register for indicating the size of the cache as RAM (e.g. at the CAR address), as referred to in the table as the ASIS_CAR_SIZE register. The ASIS_CAR_SIZE register can be written by the SIS, such as after the CAR is initialized in the SIS. The bootloader can read the ASIS_CAR_SIZE register and set up the CAR, e.g. in the second execution environment and/or for the processor core(s) in the second execution environment. Alternatively/additionally, as shown in the table of FIG. 5, the CAR can be initialized by the SIS, e.g. in the first execution environment. For example, the information indicating the CAR address and size (the CAR being initialized by the SIS) can be provided to the bootloader via the CAR registers. Alternatively/additionally, CAR can be determined per processor. For example, each processor can set up its own CAR. SIS may pass along the base and size for the bootloader to set up. For example, a set of one or more cores of a first processor can set up a CAR (e.g. after SIS writes the address and size of the CAR); and optionally one or more sets of one or more cores of a subsequent processor(s) may set up a CAR (e.g. after SIS writes the address and size of the CARs).

The registers may include at least one command register, as described herein. The table of FIG. 5 shows an ASIS_CMD register with two fields, an example. The bootloader may write to the ASIS_CMD register to provide the command to the SIS. The CMD definition can vary, e.g. a silicon vendor may vary the format of the command. In an example, one format of the CMD such as 0xFF can be a special CMD to put the SIS in auto run mode and do serialized silicon initialization.

The registers may include another status register for the status related to the execution of silicon instructions by the SIS, as commanded. In the table of FIG. 5, the ASIS_CMD register has a field for the status, asis_cmd_sts. The asis_cmd_sts, e.g. that written by the SIS, can be selected from, for example, values representing executing, done, and a CMD return value; for example, 0xFF, 0x1 and 0x1~0xFE, which may represent executing, done, and a CMD return value, respectively.

The registers may include a parameters register as described herein. The table of FIG. 5 shows an AIS_CMD_PARA register, for example. The parameters register can be for the address of command input parameters. Alternatively/additionally, the parameters register can e a pointer to point to CMD parameters. The parameters can be defined for each command.

The bootloader can use the registers to communicate with the SIS. It is possible for the bootloader to communicate with the SIS without knowing any software information of SIS. Other formats are possible, such as formats defined according to a silicon vendor.

Figure 6:
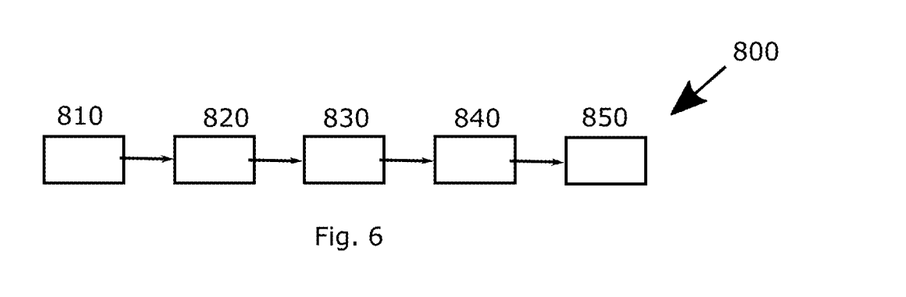
FIG. 6 illustrates a method of operating an electronic device

FIG. 6 illustrates a method 800 of operating an electronic device. The method includes executing 810 a first initial instruction at a first address, given by a first reset vector, by a first set of processor cores including at least one processor core. The method includes executing 820 a second initial instruction at a second address, given by a second reset vector, by a second set of processor cores including at least one processor core. The method may also include running 830 a silicon initialization service, in a first execution environment, by the first set of processor core(s). The method may also include running 840 a bootloader, in a second execution environment, by the second set of processor core(s). The method may also include executing 850 a first silicon initialization, by the silicon initialization service. The method may also include: in the second execution environment, writing the command to a shared register; the shared register can be write-only for the second set of processor cores and read-only for the first set of processor cores. The method may also include, in the first execution environment, reading the command from the shared register. The first silicon initialization can be based on the command.

The method of FIG. 6 can be modified such as is described in the operation of the electronic devices described with respect to the other figures. Herein is disclosed a means for operating an electronic device according to the method 800.

Figure 7:
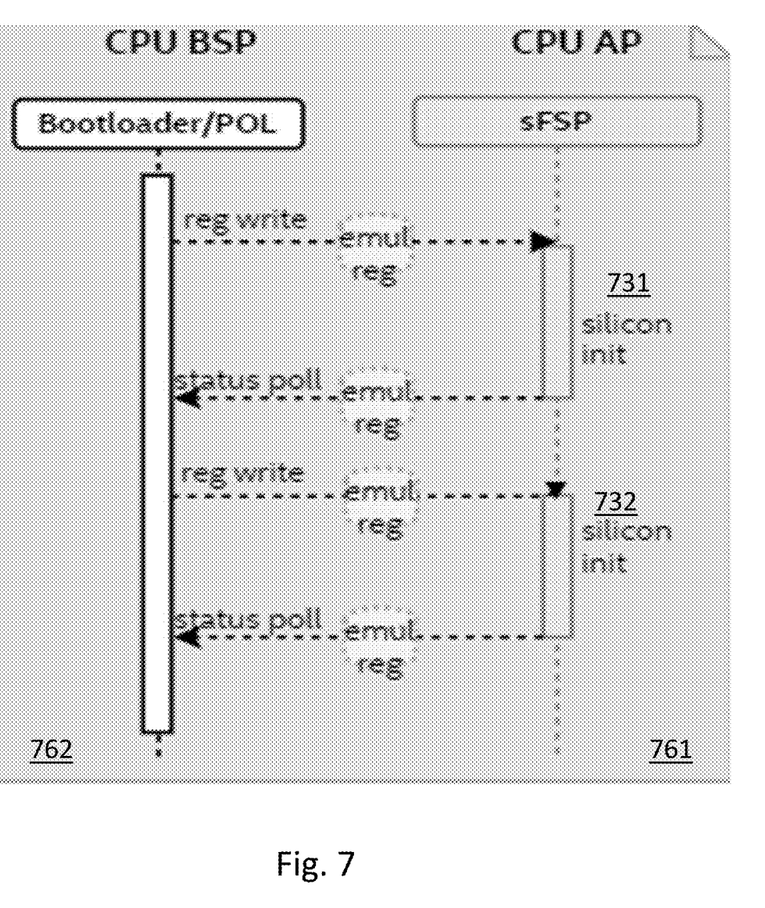
FIG. 7 illustrates an electronic device.

FIG. 7 illustrates the electronic device, such as that described elsewhere herein, particularly with respect to other figures. FIG. 7 shows a bootstrap processor (CPU BSP), which may have one or more processor cores, on the left side and an application processor (CPU AP) of one or more processor cores on the right. For example, the bootstrap processor can correspond to the second set of cores and the AP corresponds to the first set, as described herein. The AP can include the SIS as described herein. The CPU BSP and CPU AP may operate in separate execution environments. The CPU BSP can be operating in the second execution environment 762 (left side of FIG. 7) and the CPU AP in the first execution environment 761 (right side of FIG. 7). As shown in FIG. 7, the CPU BSP and CPU AP can be communicatively coupled via the register(s). The registers may be emulated registers. The bootloader, from the left side of FIG. 7 may write to a register to trigger a silicon initialization, such as a first silicon initialization 731. When the first silicon initialization is done, there may be communication via another register, e.g. via a status register, that the first silicon initialization 731 is done. The bootloader may read a status from a register indicating that the first silicon initialization 731 is done and subsequently write another command to trigger a second silicon initialization 732. Analogously to FIG. 3 in the repeatable block 350, the electronic device 700 of FIG. 7 can execute multiple silicon initializations serially. Alternatively/additionally, there may be some silicon initializations that can occur at least partially in parallel. Such parallel silicon initializations may be undertaken by multiple processor cores on the first execution environment side 761. For example, in an embodiment that may be combined with any other embodiment herein, some silicon initializations undertaken by the SIS may be done in parallel. The electronic device 700 of FIG. 7 is shown to utilize serial commands for each of two silicon initializations 731, 732. It is possible for a single command to trigger the execution of multiple silicon initializations.

Figure 8:
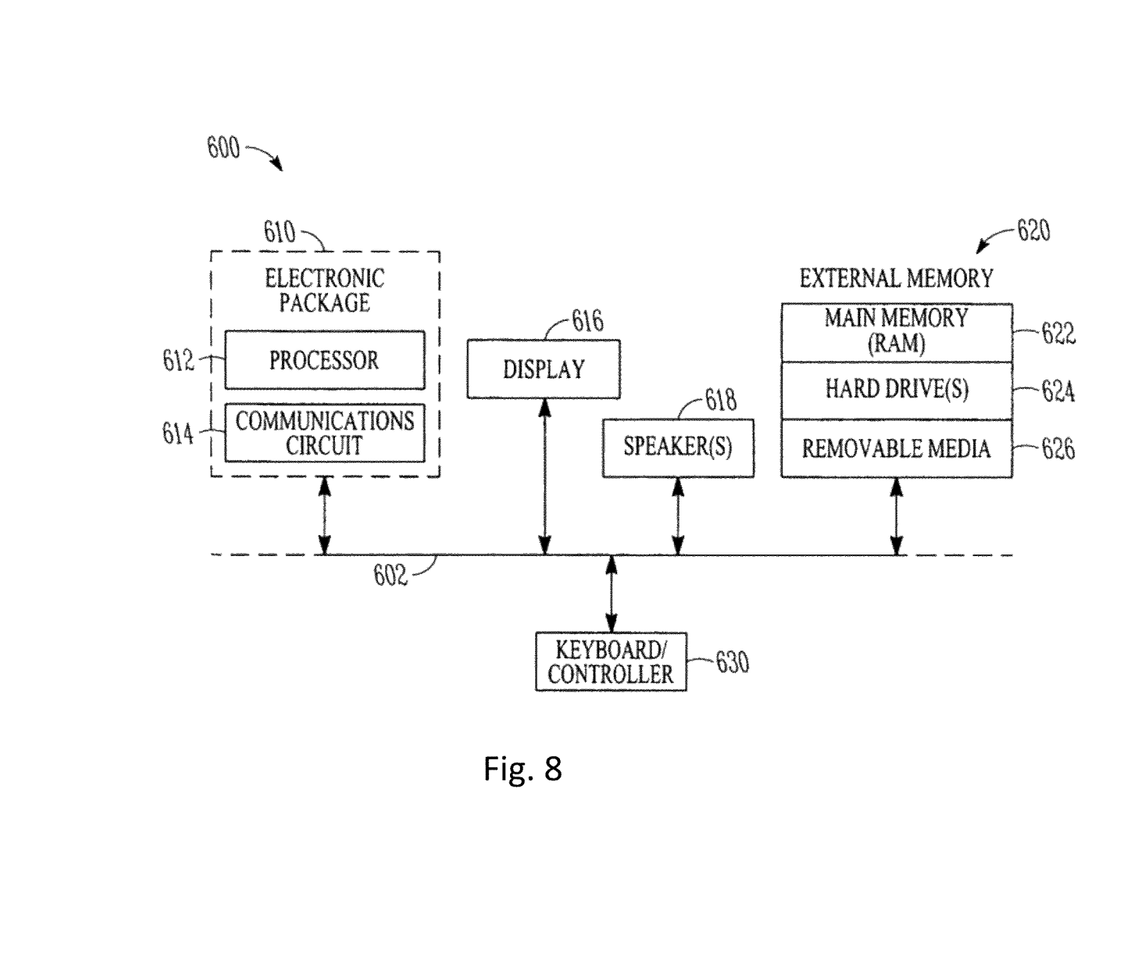
FIG. 8 illustrates a block diagram of an electronic apparatus.

FIG. 8 illustrates a block diagram of an electronic apparatus 600. The apparatus 600 can include at least one electronic device and/or method described herein. Electronic apparatus 600 is merely one example of an electronic apparatus in which forms of the electronic device and/or methods described herein may be used. Examples of an electronic apparatus 600 include, but are not limited to, personal computers, tablet computers, mobile telephones, game devices, MP3 or other digital music players, etc. In this example, electronic apparatus 600 comprises a data processing system that includes a system bus 602 to couple the various components of the electronic apparatus 600.

System bus 602 can provide communications links among the various components of the electronic apparatus 600 and may be implemented as a single bus, as a combination of busses, or in any other suitable manner.

An electronic assembly 610 as describe herein may be coupled to system bus 602. The electronic assembly 610 may include any circuit or combination of circuits. In one embodiment, the electronic assembly 610 includes a processor 612 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that may be included in electronic assembly 610 are a custom circuit, an application-specific integrated circuit (ASIC), or the like, such as, for example, one or more circuits (such as a communications circuit 614) for use in wireless devices like mobile telephones, tablet computers, laptop computers, two-way radios, and similar electronic systems. The IC can perform any other type of function.

The electronic apparatus 600 may also include an external memory 620, which in turn may include one or more memory elements suitable to the particular application, such as a main memory 622 in the form of random access memory (RAM), one or more hard drives 624, and/or one or more drives that handle removable media 626 such as compact disks (CD), flash memory cards, digital video disk (DVD), and the like.

The electronic apparatus 600 may also include a display device 616, one or more speakers 618, and a keyboard and/or controller 630, which can include a mouse, trackball, touch screen, voice—recognition device, or any other device that permits a system user to input information into and receive information from the electronic apparatus 600.

The register(s) 220 described herein can be any type of register(s). A virtual register and/or an emulated register may be able to provide flexibility, for example.

The methods and devices described herein may reduce problems with a firmware support package (FSP) and OEM/ODM codes (Bootloader) that are coupled and executed in the same environment and context. The FSP mechanism may be is vulnerable to security attacks. Integrating the BIOS together may require extra effort and time. It can increase the time to market of new products, which can be undesirable. It is desirable to speed up the time to market and reduce the effort to make a secure BIOS.

At least two modes of bootloader can be supported. A first example can be an application programming interface (API) mode (the bootloader calls predefined FSP APIs). A second example can be a dispatch mode (the bootloader modules can be dispatched together with FSP modules).

As described herein, silicon initialization logic can be isolated in a separate execution environment (e.g. the silicon initialization service SIS), e.g. separate from the bootloader's execution environment. Doing so, as described herein, may simplify system firmware. Furthermore, requirements for extra micro-controllers on a SOC can be avoided, which may avoid cost. Alternatively/additionally, CPUs can be preferred over microcontrollers for having more computational power and flexibility.

It is possible to have "pure CPU software." A SIS (see FIG. 7 for example, where the SIS can be run on the CPU AP and the bootloader on the CPU BSP) can abstract the silicon initialization interface, e.g. through registers (e.g. unified registers) which can be emulated by microcode. The SIS can allow isolation and decoupling of ODM/OEM code from vendor code, e.g. by running a bootloader on one set of one or more processor cores (e.g. a bootstrap processor such as CPU BSP seen in FIG. 7) and the silicon initialization service on another set of one or more processor cores (e.g. application processors such as CPU AP as seen in FIG. 7).

From the bootloader point of view, the SIS can be as if provided by one or more separate hardware components (eg. uControllers). The silicon initialization service can be actually fulfilled by software running on CPU APs.

The firmware security may be enhanced, such as by eliminating the constraint of license compatibility between FSP and Bootloader. It may alternatively/additionally possible to save integration costs and/or reduce the time to market. The CPU can be utilized to create differentiation, e.g. by an ODM/OEM, or even downstream.

Using previously known solutions may not allow isolation of execution environments, such as due to coupling of the firmware provided by OEM/ODM (bootloader) and by a silicon vendor (FSP). The coupling and/or interdependence, e.g. of a FSP and bootloader, can be inconvenient for development. The firmware may be more complicated. These problems can increase the time to market. Silicon initialization work can be done by the CPU, as described herein, which may reduce problems. The bootloader may call silicon initialization work through software defined APIs, e.g. by utilizing the SIS.

In another example, dedicated HW/FW assist may offload some silicon initialization work to other microcontrollers. However, this can add cost. Furthermore, a microcontroller may not be as powerful and flexible as a CPU.

Herein is disclosed a SIS, which can include a model of system firmware which can allow running a bootloader on a core, set of cores, and/or bootstrap processor (B SP) and run silicon initialization on another one or more cores and/or processors, e.g. on an application processor(s) (Aps). Two isolated execution environments can be established.

A SIS can alternatively/additionally include defining a set of registers, e.g. silicon initialization interface registers, for the communication between a bootloader and silicon initialization.

As described herein, a SIS can alternatively/additionally include a workflow using the newly defined registers so that bootloader and silicon initialization can be executed in parallel and isolated.

A SIS can provide up to full separation and isolation between a bootloader and silicon initialization. Firmware provided by OEM and a silicon vendor can be up to totally decoupled. It is possible to decouple the running mode (eg. 32 bit mode and/or long mode) and license between FSP and bootloader, improve the security, and/or time to market.

A SIS can up to fully leverage the CPU cores. Alternatively/additionally, the silicon initialization work can be executed in APs in parallel. ASIS can be powerful and/or have significant performance advantage over other solutions.

Implementing a SIS may not need extra hardware to assist the silicon initialization. This can be cost-saving. A SIS can run on Aps. The firmware design and/or firmware update can have the same flexibility as CPU firmware.

For example, as described herein and/or combinable with examples described herein, to separate a bootloader and a SIS, it is possible to wake up BSP and APs at different reset vectors. This can be fulfilled by microcode, for example. A bootloader on a board support package (BSP) can do anything that is not depending on the SIS being ready before polling the ASIS status.

Meanwhile, the SIS (on APs for example) can start to do the initialization, e.g. in parallel with the initial executions of the bootloader. The SIS can, once done with its own initialization, set ASIS_Ready to the register ASIS_STS, and program the register ASIS_CAR_BASE and ASIS_CAR_SIZE accordingly to indicate to the bootloader the base and size of CAR (Cache as RAM). Then ASIS can wait for the command to start a first silicon initialization.

After getting ASIS_Ready from the register ASIS_STS, the bootloader can start to work on the CAR, based on the information from ASIS_CAR_* register (see the table of FIG. 5 for example).

The following two steps can be repeated (see FIG. 5).
(1) Once the bootloader needs to do some silicon initialization, the bootloader can set the command to ASIS-_CMD register and also, optionally, any associated parameters in ASIS_CMD_PARA. The bootloader can wait for the response from ASIS_CMD if needed.
(2) On the SIS side, after reading the CMD, the SIS can execute the silicon initialization according to the CMD, and optionally write/program results (e.g. to the address specified in ASIS_CMD_PARA register).

Once silicon initializations are done, ASIS can set ASIS_Exit to ASIS_STS. The SIS can be exited to release the APs.

If the bootloader desires use of APs after silicon initializations, it can poll ASIS_Exit of ASIS_STS to determine if the APs are available to use.

We remark that registers, such as silicon initiation interface registers, may abstract the silicon initialization interface. The bootloader can possible only see these registers as an interface to silicon initialization services. The silicon initiation interface can be emulated by uCode registers and/or hardware registers. The uCode can take corresponding actions upon the register read/write operation.

FIG. 5 shows a table of registers, according to an example. The table shows one example of the registers for the SIS. The bootloader can use the registers to communicate with the SIS. It is possible for the bootloader to communicate with ASIS without knowing any software information of the SIS. Other formats are possible, such as formats defined according to a silicon vendor.

It can be challenging to provide an electronic device to an Original Design Manufacturer and/or Original Equipment Manufacturer (OEM/ODM) that includes a secure yet expandable means to configure alternative or additional functionality. Particularly, it can be challenging to provide an electronic device with a secure means for silicon initialization while providing original equipment manufacturers and/or original design manufacturer (OEM/ODM) some configurability. The configurations described herein can aid in providing a secure and/or flexible electronic devices, such as devices that can be configured for alternative/additional functionality. Furthermore, the configurations of devices described herein maintain security, particularly providing flexibility/configurability while maintaining security.

Alternative/additional examples of silicon initialization may include obtaining information about equipment included in the device, loading drivers for the equipment, and/or establishing interfaces for facilitating interaction between the equipment and software to be loaded in the device (e.g., the OS).

There are also challenges with compatibility (including license compatibility) between components. The examples, particularly those using separate execution environments, provided herein may address such challenges.

Some silicon initialization instructions may pertain to individual components and/or chipsets (e.g., a processor, coprocessor, support components such as bus controllers, memory, memory controllers, etc.) that may be employed in the device. Such instructions may be identical for every device utilizing the individual components and/or chipsets. When implemented in similarly configured devices, there may be little or no reason for a user of the equipment (e.g., device developer, device manufacturer, device seller, device repair facility, etc.) to alter this portion of the silicon initialization. The devices and methods described herein may provide a way to secure and/or simplify the silicon initialization instructions as used in electronic devices, particularly those using multi-core processors.

Herein a set may have one or more components. For example, a set of processor cores may have one or more processor cores; for example, a set of processor cores may have exactly one core, a plurality of cores, exactly two cores, or more than two cores. Herein status can be used interchangeably with state, such as when describing a status or state that is read or written to a register.

Herein, the term "silicon initialization service" can be used interchangeably with "abstract silicon initialization service."

Herein CMD may be used for "command." Herein ASIS may be used for SIS (silicon initialization service). For example, the term ASIS_CMD register may be a register related to a command, such as a command read by a SIS for executing at least one silicon initialization.

Herein a register which has more than one field may be regarded as multiple registers. For example, a register may have a first field which read-only in a first execution environment and write only in a second environment, and a second field which write-only in the first execution environment and read only in a second environment. In such a case, the fields of the register may be regarded as two registers. For example, the fields of the ASIS_CMD register shown in FIG. 5 are an asis_cmd field for the command, and an asis_cmd_sts field for the status of the SIS. The asis_cmd field can be read-only in the first execution environment and write-only from the second; the asis_cmd_sts field can be write-only in the first execution environment and read-only in the second. The fields of registers may be regarded as registers themselves, e.g. as sub-registers. Each of the registers and/or sub-registers described herein may be write-only for the first execution environment and read-only for the second; or write-only for the second, and read-only for the first execution environment. Alternatively/additionally, each of the registers and/or sub-registers described herein may be write-only for the first set of processor cores and read-only for the second set; or write-only for the second set of processor cores and read-only for the first set. Write and read only registers with respect to the separated execution environments (and/or different sets of processor cores) may aid in security and/or reduce compatibility difficulties.

Herein, the electronic devices may include a plurality of processor cores (e.g. first and second sets of processor core(s)) in the same die. The processor cores can be included in a multicore processor. Herein, a reset vector can be a microcoded reset vector and/or a reset vector held in ROM. Herein, initialization instructions may be at least partially executable in parallel.

Herein, silicon initialization instructions can be performed upon activation and/or resetting of a device, such as before loading the operating system (OS). Herein, second initial instruction(s) can include a bootloader, particularly one configured to operate in a second execution environment, e.g. separate from a first execution environment in which a silicon initialization service operates.

Herein, a silicon initialization service may execute instructions, e.g. execute one or more silicon initializations (e.g. all silicon initializations) before initialization of the electronic device is complete. Herein, the bootloader, by writing a command, can trigger the execution of at least one silicon initialization, e.g. when the command is read by the SIS. Herein, the bootloader may optionally provide data, e.g. an associated parameter(s), with writing of a command for executing a silicon application. The parameter may include data and/or an address which can provide data to the SIS. Alternatively/additionally, the parameter may include data in the form of an address where the SIS writes data at the completion of the associated silicon initialization (e.g. the silicon initialization associated with the command).

Herein, silicon initializations may be triggered serially by the bootloader after the bootloader reads a ready state of the SIS at a register(s), such as a status register. For example, the bootloader writes the next command for execution of the next silicon initialization after reading a ready status written by the SIS to a register when the SIS completes the immediately preceding silicon initialization that was previously triggered by the bootloader writing the previous command.

Herein, the register(s) may exclusively couple the two execution environments of the SIS and the bootloader during initialization of the electronic device.

The electronic device's configurations, as described herein, can be particularly relevant as to the device's configuration upon bootup, during bootup, before control is passed to the operating system, while the first and second execution environments are separated (e.g. communicatively coupled by the register(s)), and/or during initialization of the electronic device.

The electronic device's functions described herein can be carried out by the processor cores, e.g. the device's configuration may be due to the configuration of the processor(s), processor core(s), and/or memory which may be part of the device and/or coupled to the device. Alternatively/additionally, the processor cores described herein may have access to memory and/or instructions such that the functions described herein (e.g. those of the SIS and/or bootloader) may be executed.

The electronic devices described herein can include a memory which is configured to store a first microcode for waking up the SIS and/or a second microcode for waking up the bootloader. Herein the SIS may be in the form of a set of executable computer instructions in code, e.g. in nontransitory computer readable media.

The examples described hereinabove and below may aid in addressing issues such as those that are explained herein, particularly during bootup and/or initialization of the electronic device. For example, the use of a set of processor core(s) for silicon initialization that can be commanded by a bootloader via communication via a register may provide security and/or flexibility for silicon vendors and/or OEM/ODM as well as others such as users. Processor core(s), including but not necessarily limited to those in the execution environment of an SIS, can aid in providing flexible initialization services. The core(s), register(s), bootloader, and/or SIS, configured as described herein, may have or provide parallel capacity for initialization(s), which may improve security and/or increase speed of bootup/initialization(s).

The following group of examples are hereby described.

Example 1 is an electronic device including a first set of processor cores including at least one processor core and a second set of processor cores including at least one processor core. The electronic device is configured such that during initialization of the electronic device: the first set of processor cores executes first initialization instructions in a first execution environment, the second set of processor cores executes second initialization instructions in a second execution environment, and the first set and the second set at least one of read or write to a shared register. Optionally the first and second initialization instructions are at least partially executable in parallel.

Example 2 is according to the electronic device of example 1, and the first initialization instructions include a silicon initialization service and/or the second initialization instructions include a bootloader.

Example 3 is according to the electronic device of any preceding example, and the electronic device is configured such that during initialization of the electronic device: each register of a plurality of shared registers including the shared register is: write-only for the primary set of processor cores and read-only for the secondary set, or write-only for the secondary set of processor cores and read-only for the primary set.

Example 4 is according to the electronic device of any preceding example, and the device includes a die which includes the primary and secondary sets of processor cores.

Example 5 is according to the electronic device of any preceding example, and the first set of processor cores is configured to begin executing the first initialization instructions at a first address given by a first reset vector. The second set of processor cores is configured to begin executing the second initialization instructions at a second address given by a second reset vector. The first and/or second reset vector is optionally a microcoded reset vector, such as a reset vector held in ROM.

Example 6 is according to the electronic device of any preceding example, and the bootloader polls a status of the silicon initialization service at a status register of the plurality of shared registers. The silicon initialization service executes each of a first through Nth silicon initialization instruction after a corresponding command for the corresponding first through Nth silicon initialization instruction is read from the plurality of shared registers. The command can be an integer sent to the same register, (e.g. 1, 2, 3 . . . to trigger each of the N silicon initialization instructions). In another example a 1 is sent to a different register (command registers 1 through N) assigned to each silicon initialization. In another example, the command register has a plurality of fields, such as 1-bit fields, which may each be written to to trigger a respective silicon initialization.

Example 7 is according to the electronic device of any preceding example, and such that the bootloader commands execution of at least a first of the N silicon initialization instructions by writing a first command to the plurality of the shared registers. Optionally, the N silicon initialization instructions are executed serially when triggered by the first command.

Example 8 is according to the electronic device of any preceding example, and, the bootloader commands execution of each of the N silicon initialization instructions by writing a respective command to the plurality of shared registers.

Example 9 is according to the electronic device of any preceding example, and the bootloader is configured to provide, at a parameters register, an associated parameter (e.g. ASIS_CMD_PARA) for association with any of the N silicon initialization instructions.

The following group of examples are also hereby described, referred to each as "A-" examples, examples A9-A17. The functionalities and/or features of the enumerated "A-" examples can be incorporated into the enumerated examples above, particularly as regard to the functions and features of the first set of processor cores of examples 1-9. For example, the first set of cores as described above in examples 1-9 may be configured to execute the SIS, such as it is described elsewhere herein including in examples A9-A17, or to read/write to a register(s).

The functions and/or features of the at least one processor core of the A-examples may also be incorporated into the later groups of examples, such as the "B-" examples. For example, the at least one processor core of the A-examples (and any functionalities and features thereof) can be incorporated into the first set of at least one processor core of the B-examples. Alternatively/additionally, the functions and/or features of the first set of processor cores of the "B-" examples can include the features and/or functions of the first set of processor cores of the "A-" examples, and vice versa.

Example A9 is an electronic device including: at least one processor core. The at least one processor core is configured to execute a silicon initialization service configured (particularly during initialization of the electronic device and/or a second electronic device) to: write a ready status to a status register indicating a ready state of the silicon initialization service, read a first command at a command register, execute a first silicon initialization instruction corresponding to the first command, and write an exit status of the silicon initialization service to the status register, and exit the silicon initialization service.

Example A10 is the electronic device of example A9, and the at least one processor core includes a first processor core configured to wake at a reset vector, when the electronic device is reset, before executing the silicon initialization service.

Example A11 is the electronic device of claim A9 or A10, and the silicon initialization service is configured to: write an address of a cache as RAM to a first CAR register, and write a size of the cache as RAM to a second CAR register.

Example A12 is the electronic device of any of examples A9-A11, and the silicon initialization service is configured such that the ready status is written before the first command is read.

Example A13 is the electronic device of any of examples A9-A12, and the silicon initialization service (SIS) is configured to read a plurality of commands, including the first command, at the command register. The SIS can execute a respective silicon initialization instruction of a plurality of silicon initializations, including the first silicon initialization instruction, corresponding to each command of the plurality of commands.

Example A14 is the electronic device of any example A9-A13, in which the silicon initialization service is configured to read, at a parameters register, an associated parameter which is associated with any of the plurality of commands. The associated parameter can be an address where a result is written by the SIS, such as at the end of the execution of a silicon initialization corresponding to the command.

Example A15 is according to the electronic device of any example A9-A14, in which the silicon initialization service is configured to write an initialization status to a second status register. The initialization status can be selectable from a group of possible initialization statuses comprising: executing, done, and a return value.

Example A16 is according to any example A9-A15, in which the silicon initialization service is executed in a first execution environment. The electronic device can be communicatively coupleable to a second execution environment through at least one register, such as at least one of: the status register, a command register, a first CAR register, a second CAR register, a parameters register, or a second status register.

Example A17 is according to any example A9-A16, in which the first silicon initialization instruction is one of: a processor initialization, a chipset initialization, a memory initialization, a bus initialization, a device initialization, a memory controller initialization, or a processor cache initialization.

The following group of examples are also hereby described, referred to each as "B-" examples, starting with B18.

Example B18 is an electronic device including a plurality of processor cores including a first set of at least one processor core and a second set of at least one processor core. The first set is configured to execute first instructions at a first address given by a first reset vector, and the second set is configured to execute second instructions at a second address given by a second reset vector.

Example B19 is the electronic device of claim B18, in which the first set is configured to execute the first instructions in a first execution environment, and the second set is configured to execute the second instructions in a second execution environment.

Example B20 is according to example B18 or B19, in which the first set of processor cores is configured to start a silicon initialization service in the first execution environment. The silicon initialization service can be configured to execute a first through Nth silicon initialization after receiving a command for at least the first silicon initialization. The following group of examples are also hereby described, referred to each as "C-" examples.

Example C21 is a method of operating an electronic device, including executing a first initial instruction at a first address, given by a first reset vector, by a first set of processor cores including at least one processor core. The method may include executing a second initial instruction at a second address, given by a second reset vector, by a second set of processor cores including at least one processor core. The method may include running a silicon initialization service, in a first execution environment, by the first set. The method may include running a bootloader, in a second execution environment, by the second set. The method may include executing a first silicon initialization, by the silicon initialization service.

Example C22 is according to C21, and the method may also include: in the second execution environment, writing a command to a shared register. The shared register can be write-only for the second set of processor cores and read-only for the first set of processor cores. The method may include reading the command from the shared register in the first execution environment. The first silicon initialization can be based on the command.

Examples C21 and C22 can be modified according to the features and/or functionalities described with respect to any of the examples 1-9, A9-A17, B18-20, and D1.

Example D1 is an electronic device including a first set of processor cores including at least one processor core and a second set of processor cores including at least one processor core.

The electronic device includes a means for, during initialization of the electronic device, executing first initialization instructions in a first execution environment by the first set of processor cores, and a means for executing second initialization instructions in a second execution environment by the second set of processor cores. The first set and the second set at least one of read or write to a shared register. Optionally the first and second initialization instructions are at least partially executable in parallel.

In another example, there is a nontransitory computer readable media that includes instructions for executing the SIS and/or bootloader as described herein.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and sub-combinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods. The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An electronic device, comprising:
   a first set of processor cores including at least one processor core; and
   a second set of processor cores including at least one processor core,
   wherein the electronic device is configured such that during initialization of the electronic device:
      the first set of processor cores executes first initialization instructions in a first execution environment,
      the second set of processor cores executes second initialization instructions in a second execution environment, and
      the first set and the second set at least one of read or write to a shared register.

2. The electronic device of claim 1, wherein the first initialization instructions include a silicon initialization service.

3. The electronic device of claim 1, further comprising:
   a die which includes the first and second sets of processor cores.

4. The electronic device of claim 1, wherein
   the first set of processor cores is configured to begin executing the first initialization instructions at a first address given by a first reset vector; and
   the second set of processor cores is configured to begin executing the second initialization instructions at a second address given by a second reset vector.

5. The electronic device of claim 1, wherein
   the electronic device is configured such that during initialization of the electronic device:
   each register of a plurality of shared registers including the shared register is:
      write-only for the first set of processor cores and read-only for the second set, or
      write-only for the second set of processor cores and read-only for the first set.

6. The electronic device of claim 2, wherein the electronic device is configured such that:
   a bootloader polls a status of the silicon initialization service at a status register of a plurality of shared registers;
   wherein the silicon initialization service is configured to execute each of a first through Nth silicon initialization instruction after a corresponding command for the corresponding first through Nth silicon initialization instruction is read from the plurality of shared registers.

7. The electronic device of claim 1, configured such that a bootloader, in the second execution environment, commands execution of at least a first of N silicon initialization instructions by writing a first command to one of a plurality of shared registers including the shared register; wherein the N silicon initialization instructions are executed in the first execution environment.

8. The electronic device of claim 1, configured such that:
   a bootloader is configured to provide, at a parameters register, an associated parameter for association with any of a first through Nth silicon initialization instructions to the first execution environment for the one or more of the N silicon initializations.

9. An electronic device, comprising
   at least one processor core;
   wherein the at least one processor core is configured to execute a silicon initialization service configured to:
      write a ready status to a status register indicating a ready state of the silicon initialization service,
      read a first command at a command register,
      execute a first silicon initialization instruction corresponding to the first command in a first execution environment,
      write an exit status of the silicon initialization service to the status register, and
      exit the silicon initialization service.

10. The electronic device of claim 9, wherein the at least one processor core includes a first processor core configured to wake at a reset vector, when the electronic device is reset, before executing the silicon initialization service.

11. The electronic device of claim 9, wherein the silicon initialization service is configured to:
    write an address of a cache as RAM to a first CAR register, and
    write a size of the cache as RAM to a second CAR register.

12. The electronic device of claim 9, wherein the silicon initialization service is configured such that:
    the ready status is written before the first command is read.

13. The electronic device of claim 9, wherein the silicon initialization service is configured to:
    read a plurality of commands, including the first command, at the command register, and
    execute a respective silicon initialization instruction of a plurality of silicon initializations, including the first silicon initialization instruction, corresponding to each command of the plurality of commands.

14. The electronic device of claim 13, wherein the silicon initialization service is configured to:
    read, at a parameters register, an associated parameter which is associated with any of the plurality of commands.

15. The electronic device of claim 9, wherein the silicon initialization service is configured to:
    write an initialization status to a second status register, the initialization status being selectable from a group of possible initialization statuses comprising: executing, done, and a return value.

16. The electronic device of claim 9, configured such that:
    the silicon initialization service is executed in a first execution environment; and
    the electronic device is communicatively coupleable to a second execution environment through at least one of: the status register, a command register, a first CAR register, a second CAR register, a parameters register, or a second status register.

17. The electronic device of claim 9, configured such that:
    the first silicon initialization instruction is one of: a processor initialization, a chipset initialization, a memory initialization, a bus initialization, a device initialization, a memory controller initialization, or a processor cache initialization.

18. An electronic device comprising:
a plurality of processor cores including a first set of at least one processor core and a second set of at least one processor core,
wherein the first set is configured to execute first instructions at a first address given by a first reset vector, and
the second set is configured to execute second instructions at a second address given by a second reset vector.

19. The electronic device of claim 18, wherein:
the first set is configured to execute the first instructions in a first execution environment, and
the second set is configured to execute the second instructions in a second execution environment.

20. The electronic device of claim 19, wherein:
the first set of processor cores is configured to start a silicon initialization service in the first execution environment; wherein the silicon initialization service is configured to execute a first through Nth silicon initialization after receiving a command for at least the first silicon initialization.

21. A method of operating an electronic device, comprising:
executing a first initial instruction at a first address, given by a first reset vector, by a first set of processor cores including at least one processor core;
executing a second initial instruction at a second address, given by a second reset vector, by a second set of processor cores including at least one processor core;
running a silicon initialization service, in a first execution environment, by the first set;
running a bootloader, in a second execution environment, by the second set; and
executing a first silicon initialization, by the silicon initialization service.

22. The method of operating an electronic device of claim 21, comprising:
in the second execution environment, writing a command to a shared register;
wherein the shared register is write-only for the second set of processor cores and read-only for the first set of processor cores; and
in the first execution environment, reading the command from the shared register; and wherein the first silicon initialization is based on the command.

* * * * *